US010373727B2

(12) United States Patent
Song et al.

(10) Patent No.: US 10,373,727 B2
(45) Date of Patent: Aug. 6, 2019

(54) PREPREG MICA TAPE AND COIL USING SAME

(71) Applicant: HITACHI CHEMICAL COMPANY, LTD., Tokyo (JP)

(72) Inventors: Shihui Song, Tokyo (JP); Takaya Yamamoto, Tokyo (JP); Yoshitaka Takezawa, Tokyo (JP)

(73) Assignee: HITACHI CHEMICAL COMPANY, LTD, Tokyo (JP)

( * ) Notice: Subject to any disclaimer, the term of this patent is extended or adjusted under 35 U.S.C. 154(b) by 0 days.

(21) Appl. No.: 15/027,802

(22) PCT Filed: Oct. 9, 2014

(86) PCT No.: PCT/JP2014/077108
§ 371 (c)(1),
(2) Date: Apr. 7, 2016

(87) PCT Pub. No.: WO2015/053374
PCT Pub. Date: Apr. 16, 2015

(65) Prior Publication Data
US 2016/0247595 A1 Aug. 25, 2016

(30) Foreign Application Priority Data
Oct. 9, 2013 (JP) ................................ 2013-212223

(51) Int. Cl.
*H01B 3/04* (2006.01)
*H01F 5/06* (2006.01)
*C09J 7/20* (2018.01)

(52) U.S. Cl.
CPC ................. *H01B 3/04* (2013.01); *C09J 7/20* (2018.01); *H01F 5/06* (2013.01)

(58) Field of Classification Search
CPC ................. C09J 7/02; H01B 3/04; H01F 5/06
See application file for complete search history.

(56) References Cited

U.S. PATENT DOCUMENTS

| | | | | |
|---|---|---|---|---|
| 4,491,618 | A | 1/1985 | Kuwajima et al. | |
| 2006/0231201 | A1 | 10/2006 | Smith et al. | |
| 2012/0315435 | A1 * | 12/2012 | Segletes | H01B 3/006 428/137 |

FOREIGN PATENT DOCUMENTS

| | | | |
|---|---|---|---|
| JP | S53-5799 | A | 1/1978 |
| JP | S56-159011 | A | 12/1981 |

(Continued)

OTHER PUBLICATIONS

Sawa et al. JP 2008027819 “Prepreg material, electric insulating prepreg tape, and rotary electric machine using this”, Feb. 7, 2008 (Machine Translation).*

Hisayasu et al., JP 57141474 “Epoxy Mica Tape and Sheet”, Sep. 1, 1982 (Abstract only, Machine Translation).*

(Continued)

*Primary Examiner* — Cheng Yuan Huang
(74) *Attorney, Agent, or Firm* — Fitch, Even, Tabin & Flannery, L.L.P.

(57) ABSTRACT

A prepreg mica tape includes: a backing material (3); a boron nitride-containing layer (1) that is provided on or above one surface of the backing material (3) and that includes a boron nitride particle (5) and a first resin (4); and a mica-containing layer (2) that is provided on or above the surface of the backing material (3) on which the boron nitride-containing layer (1) is provided and that includes mica (6) and a second resin (4).

15 Claims, 2 Drawing Sheets

(56) References Cited

FOREIGN PATENT DOCUMENTS

| | | | |
|---|---|---|---|
| JP | 57141474 | * | 9/1982 |
| JP | S57-172607 | A | 10/1982 |
| JP | H04-162312 | A | 6/1992 |
| JP | H09-045133 | A | 2/1997 |
| JP | 2000-116047 | A | 4/2000 |
| JP | 2002-93257 | A | 3/2002 |
| JP | 2002-093257 | A | 3/2002 |
| JP | 2005-199562 | A | 7/2005 |
| JP | 2008-027819 | A | 2/2008 |
| JP | 2008-220095 | A | 9/2008 |
| JP | 2010-158113 | A | 7/2010 |
| JP | 2010-166809 | A | 7/2010 |
| JP | 2012-175799 | A | 9/2012 |
| JP | 2012-244861 | A | 12/2012 |
| JP | 2013-39834 | A | 2/2013 |
| WO | 2012/121224 | A1 | 9/2012 |

OTHER PUBLICATIONS

International Search Report for PCT/JP2014/077108 dated Jan. 6, 2015; English translation submitted herewith (5 Pages).

Written Opinion of the International Searching Authority for PCT/JP2014/077108 dated Jan. 6, 2015 (4 Pages).

Junpeng et al., Studies of Boron Nitride-filled Epoxy Resin/Glass Fiber Insulation Thermal Conductive Composite Material,China Plastics, vol. 25, No. 06, Jun. 30, 2011, pp. 38-41.

Office Action of Chinese AppIn. No. 201480055766.8 dated Nov. 28, 2016 with partial English translation.

Notice of Reasons for Rejection dated Oct. 18, 2016, for counterpart Japanese Patent Application No. 2015-541640, together with English language translation thereof.

Decision to Grant a Patent dated Jan. 17, 2017, for counterpart Japanese Patent Application No. 2015-541640, together with English language translation thereof.

* cited by examiner

PREPREG MICA TAPE AND COIL USING SAME

CROSS-REFERENCE TO RELATED APPLICATIONS

This application is a U.S. national phase application filed under 35 U.S.C. § 371 of International Application No. PCT/JP2014/077108, filed Oct. 9, 2014, designating the United States, which claims priority from Japanese Patent Application No. 2013-212223, filed Oct. 9, 2013, which are hereby incorporated herein by reference in their entirety.

TECHNICAL FIELD

The present invention relates to a prepreg mica tape and a coil using the same.

BACKGROUND ART

In the field of generators using an indirect cooling system that cools by sending hydrogen gas or air to the outside of a coil provided with an insulation layer, the achivement of a high thermal conductivity in a thickness direction of the insulation layer of the coil is desired.

Prepreg mica tapes composed of a resin, mica, and a backing material are often used as the insulation layer of a coil. In order to improve the thermal conductivity of the prepreg mica tapes, in many cases, a technique of adding an inorganic filler having a higher thermal conductivity than a resin and mica into the tapes is employed.

There are cases in which the prepreg mica tapes are required to have flexibility in terms of facilitating coil taping work.

For example, Table 1 and Examples 3 and 4 of Japanese Patent Application Laid-Open (JP-A) No. 2005-199562 disclose mica tapes each in which, as an inorganic filler, an alumina having a high thermal conductivity is filled in mica, and show that mica tapes having thermal conductivities of from 0.32 W/m·K to 0.36 W/m·K can be obtained.

In addition, Table 1 and Examples 1 to 7 of JP-A No. 2000-116047 disclose mica tapes each in which an alumina having a high thermal conductivity as an inorganic filler is filled in a resin, and show that mica tapes having thermal conductivities of from 0.40 W/m·K to 0.60 W/m·K can be obtained.

SUMMARY OF INVENTION

Technical Problem

As a conventional method for increasing thermal conductivity of a mica tape, a method of filling an alumina having a higher thermal conductivity than mica and resin into a mica layer or resin, as described in JP-A No. 2005-199562 and JP-A No. 2000-116047, is generally used. However, such a method seems to have the following three problems.

The first problem is that, in the case of utilizing a method of papermaking a slurry mixture slurry of mica pieces and alumina particles by using a papermaking machine or the like, the alumina particles tend to easily fall through mesh due to the alumina being included in a mica layer. As a result, it becomes difficult to perform papermaking of alumina-containing mica paper and the production cost increases.

The second problem is that while alumina has a higher thermal conductivity than mica and resin, an effect of improving the thermal conductivity of an alumina-filled mica tape is actually not very significant. For example, in JP-A No. 2005-199562, the thermal conductivities of the alumina-filled mica tapes do not reach 0.4 W/m·K. Conventional products containing no highly-thermal conductive inorganic filler are known to have a thermal conductivity of about 0.3 W/m·K. From a practical viewpoint, it is not very meaningful to fill alumina particles into a mica tape unless a thermal conductivity twice or more than that of conventional products is obtained.

The third problem is that although addition of alumina slightly increases thermal conductivity of a mica tape, other characteristics required for the mica tape tend to be impaired. For example, since an alumina-filled mica tape is hard, it is difficult to perform coil taping work. In addition, as compared to scale-like mica pieces, addition of spherical alumina particles generally shortens a current path; therefore, the dielectric withstanding voltage of the mica tape may be reduced. Furthermore, alumina has a large dielectric constant and, therefore, is not preferable for use as an electrically insulating material. On the other hand, in a case in which alumina particles are incorporated between mica pieces, the alumina particles cannot suppress tree deterioration and therefore the effect of a mica layer suppressing tree deterioration is reduced. As a result, degradation lifetimes of coils under voltage stress have sometimes become shorter than in conventional coils. Accordingly, it has been difficult to use such coils in actual equipment.

As described above, many mica tapes in which alumina has been added have been considered in the past. However, due to the above-described three problems, it has been difficult to apply, to actual equipment, a highly-thermal conductive mica tape produced by adding alumina.

Although JP-A No. 2000-116047 also considered a mica tape in which boron nitride (BN) having a higher thermal conductivity was added as an inorganic filler instead of alumina, a thermal conductivity of only 0.40 W/m·K was obtained.

In addition, even with the addition of BN, no mica tape has been developed to date that has a thermal conductivity twice or more than that of conventional products, i.e., 0.6 W/m·K or more, while not impairing other mechanical characteristics, electrical characteristics, and the like.

It is an object of the present invention to provide a prepreg mica tape that has high thermal conductivity and exhibits both favorable flexibility and high dielectric withstanding voltage and a coil using the prepreg mica tape.

Solution to Problem

Specific means for solving the problems are as follows.

<1> A prepreg mica tape, including:

a backing material;

a boron nitride-containing layer that is provided on or above one surface of the backing material, and that includes boron nitride and a first resin; and a mica-containing layer that is provided on or above the one surface of the backing material on which the boron nitride-containing layer is provided, and that includes mica and a second resin.

<2> The prepreg mica tape according to <1>, in which the boron nitride-containing layer and the mica-containing layer are provided in this order on or above the one surface of the backing material.

<3> The prepreg mica tape according to <1> or <2>, in which a percentage of mica pieces having a particle size of 2.8 mm or more, obtained by sieving the mica using a JIS standard sieve, is 50% by mass or more.

<4> The prepreg mica tape according to any one of <1> to <3>, in which the boron nitride has an average particle size of from 1 to 40 μm.

<5> A coil, including an insulation layer that is a layered body of the prepreg mica tape according to any one of <1> to <4>.

Advantageous Effects of Invention

According to the present invention, a prepreg mica tape that has a high thermal conductivity and exhibits both favorable flexibility and high dielectric withstanding voltage, and a coil using the prepreg mica tape can be provided.

DESCRIPTION OF EMBODIMENTS

Figure 1:
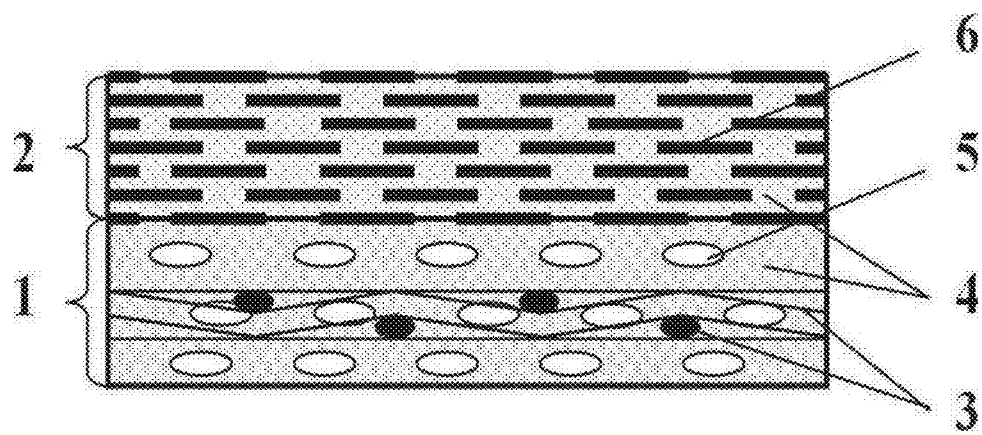
FIG. 1 is a schematic sectional view showing prepreg mica tapes of Examples 1 to 4.

Hereinafter, detailed descriptions will be given to a prepreg mica tape of the present invention and a coil using the prepreg mica tape.

As used herein, the term "step" denotes not only an independent step but also a step that cannot be clearly distinguished from other steps, as long as an intended object of the step is achieved. Additionally, a numerical range shown using "to" denotes a range including numerical values put before and after "to" as a minimum value and a maximum value, respectively. Furthermore, in a case in which a plurality of substances corresponding to each component are present in a composition, the amount of each component included in the composition means the total amount of the plurality of substances in the composition unless otherwise noted. Additionally, as used herein, the term "layer" encompasses a structure having a shape formed on an entire surface and also a structure having a shape formed on a part of the surface when observed in a plan view.

<<Prepreg Mica Tape>>

The prepreg mica tape of the invention includes: a backing material; a boron nitride-containing layer that is provided on or above one surface of the backing material, and that includes boron nitride and a first resin; and a mica-containing layer that is provided on or above the one surface of the backing material on which the boron nitride-containing layer is provided, and that includes mica and a second resin.

The prepreg mica tape of the invention has a high thermal conductivity and exhibits both favorable flexibility and high dielectric withstanding voltage. It is unclear why the prepreg mica tape of the invention has a high thermal conductivity and exhibits both favorable flexibility and high dielectric withstanding voltage. However, the reason for that is presumed as follows.

The prepreg mica tape of the invention includes the boron nitride-containing layer including boron nitride and a first resin, and boron nitride is a highly-thermal conductive filler. Therefore, the prepreg mica tape of the invention including the boron nitride-containing layer including boron nitride is presumed to have a high thermal conductivity.

In addition, since boron nitride has a degree of hardness about one-half or less than the degree of hardness of alumina, the prepreg mica tape of the invention is presumed to exhibit more favorable flexibility than mica tapes using alumina as a highly-thermal conductive filler.

Furthermore, by individually providing the boron nitride-containing layer and the mica-containing layer, boron nitride particles can be prevented from being incorporated between mica pieces. Incorporation of the boron nitride-containing particles between the mica pieces leads to shortening of a current path, which thereby may cause a decrease in the dielectric withstanding voltage of the mica tape. However, in the prepreg mica tape of the invention, incorporation of the boron nitride particles between the mica pieces is prevented and, as a result, shortening of the current path hardly occurs. Accordingly, the prepreg mica tape of the invention is presumed to exhibit high dielectric withstanding voltage.

Furthermore, the boron nitride-containing layer and the mica-containing layer are both provided on or above the one surface of the backing material, and the backing material is provided on another surface of the prepreg mica tape of the invention, thereby improving workability during wrapping of a coil or the like with the prepreg mica tape of the invention.

The prepreg mica tape of the invention is referred to also as "resin rich mica tape". In other words, a large amount of a resin-containing composition is included in advance in the entire prepreg mica tape, making it unnecessary to inject an impregnation varnish. The content percentage of the resin-containing composition is set according to a use purpose in a range of generally about from 15% by mass to 50% by mass with respect to the total mass of the prepreg mica tape, as described in JP-A No. 2010-193673.

When wrapping a coil or the like with the prepreg mica tape, since the prepreg mica tape can be wound around the coil or the like with tension, a compression force caused by the tension is applied to the boron nitride-containing layer and the mica-containing layer that are in a prepreg state. Thereby, during heating processing or the like of the coil or the like wound with the prepreg mica tape, movement of a resin component(s) present in the boron nitride-containing layer and the mica-containing layer is more effectively performed, thereby increasing a mica density of the mica-containing layer and a boron nitride density of the boron nitride-containing layer. Accordingly, electrically insulating properties of the prepreg mica tape of the invention as an insulation material and the properties (for example, thermal conductivity) of boron nitride can be more effectively exerted.

The prepreg mica tape of the invention has a thickness of preferably from 200 μm to 400 μm, and more preferably from 250 μm to 350 μm.

The average thickness of the prepreg mica tape is obtained as an arithmetic mean value resulting from measurement of thicknesses of 10 points using a micrometer (MDC-SB, available from Mitutoyo Corporation).

<Layer Structure of Prepreg Mica Tape>

The prepreg mica tape of the invention may be any structure as long as the prepreg mica tape includes: a backing material; a boron nitride-containing layer provided on or above one surface of the backing material; and a mica-containing layer provided on or above the one surface of the backing material on which the boron nitride-containing layer is provided. The prepreg mica tape of the invention may include other layers, if necessary. The order of the boron nitride-containing layer and the mica-containing layer provided on or above the one surface of the backing material is not particularly limited. The backing material, the boron nitride-containing layer, and the mica-containing layer may be provided in this order, or the backing material, the mica-containing layer, and the boron nitride-containing layer may be provided in this order.

In the prepreg mica tape of the invention, the boron nitride-containing layer and the mica-containing layer are preferably provided in this order on or above one surface of the backing material in terms of easy manufacturing.

In addition, examples of the other layers that are provided if necessary include a protection layer (a protection film) that is provided at an outermost surface of the side of the backing material where the boron nitride-containing layer and the like are provided and an adhesion layer.

—Boron Nitride-Containing Layer—

The boron nitride-containing layer according to the invention includes boron nitride and a first resin. The boron nitride-containing layer according to the invention may include other components other than the boron nitride and the first resin, if necessary. Examples of the other components include a curing agent, a curing catalyst, and various kinds of additives.

The thickness of the boron nitride-containing layer is not particularly limited, but preferably is in a range of from 80 μm to 200 μm.

The thickness of the boron nitride-containing layer may be obtained by observing a secondary electron image at an acceleration voltage of 10 kV under high vacuum through a scanning electron microscope (SEM) (XL30, available from Philips Corporation) after platinum deposition on a section of the prepreg mica tape.

The boron nitride-containing layer may include other inorganic fillers other than boron nitride. The content percentage of boron nitride with respect to the total amount of inorganic fillers contained in the boron nitride-containing layer is preferably from 90 to 100% by mass, more preferably from 95 to 100% by mass, and still more preferably from 98 to 100% by mass. In a case in which the boron nitride-containing layer contains other inorganic fillers other than boron nitride, examples of the other inorganic fillers include alumina, magnesium oxide, aluminium nitride, silicon nitride, and silicon oxide.

—Mica-Containing Layer—

The mica-containing layer according to the invention includes mica and a second resin. The mica-containing layer according to the invention may include other components other than the mica and the second resin, if necessary. Examples of the other components include a curing agent, a curing catalyst, and various kinds of additives.

The thickness of the mica-containing layer is not particularly limited, but preferably in a range of from 100 μm to 250 μm, and more preferably in a range of from 110 μm to 230 μm.

The thickness of the mica-containing layer can be obtained by observing a secondary electron image at an acceleration voltage of 10 kV under high vacuum through a scanning electron microscope (SEM) (XL30, available from Philips Corporation) after platinum deposition on a section of the prepreg mica tape.

It is preferable that the mica-containing layer does not include any other inorganic filler (such as boron nitride) other than the mica. The content percentage of the inorganic filler other than the mica with respect to the total amount of inorganic fillers contained in the mica-containing layer is preferably 3% by mass or less, more preferably 2% by mass or less, still more preferably 1% by mass, and particularly preferably 0% by mass.

<Constituent Materials of Prepreg Mica Tape>

Hereinafter, descriptions will be given of the backing material, the first resin, the second resin, boron nitride, and mica as components of the prepreg mica tape of the invention and other components used if necessary.

—Backing Material—

The backing material used in the present invention may be, for example, a cloth obtained by entirely or partially using a fiber composed of an organic material. Examples of the organic material that is used to obtain the cloth include aramid, polyamide, polyimide, and polyester. In a case of partially using a fiber composed of an organic material, the fiber composed of an organic material may be used as warp or weft, or as both thereof. An inorganic fiber such as a glass fiber may be used as a fiber other than the fiber composed of an organic material. A glass cloth using a glass fiber and an organic polymer film may be used in combination.

—Boron Nitride—

Examples of the boron nitride included in the boron nitride-containing layer according to the invention include hexagonal boron nitride (h-BN), cubic boron nitride (c-BN), and Wurtzite boron nitride. Among these boron nitrides, hexagonal boron nitride (h-BN) is preferable. The boron nitride may be a primary particle of boron nitride formed into a scale-like shape, or a secondary particle formed from aggregates of such primary particles.

The boron nitride has an average particle size of preferably from 1 μm to 40 μm, more preferably from 5 μm to 20 μm, and still more preferably from 5 μm to 10 μm.

When the boron nitride has an average particle size of 1 μm or more, thermal conductivity and dielectric withstanding voltage tend to be further improved. When the boron nitride has an average particle size of 40 μm or less, an excessive increase in anisotropy of the thermal conductivity due to anisotropy of the particle shape may be prevented.

The average particle size of the boron nitride can be measured using a laser diffraction scattering type particle size distribution analyzer (MICROTRAC MT3000II, available from Nikkiso Co., Ltd). A boron nitride powder is put into pure water and then dispersed using an ultrasonic disperser. The particle size distribution of the boron nitride is measured by measuring the particle size distribution of the dispersion. Based on the particle size distribution, the average particle size is obtained as a particle size corresponding to a cumulative volume of 50% from a small size side.

In the invention, the boron nitride may be used singly or in combination of two or more kinds thereof. Examples of combination of two or more kinds of boron nitrides include use of two or more kinds of boron nitrides that are the same in component and different in average particle size, use of two or more kinds of boron nitrides that are the same in average particle size and different in component, and use of two or more kinds of boron nitrides that are different in average particle size and kind.

The content percentage of the boron nitride with respect to the total amount of all solid contents except the backing material and the mica included in the prepreg mica tape of the invention is preferably from 10 to 50% by volume, and more preferably from 15 to 35% by volume. When the content percentage of the boron nitride is 10% by volume or more, the thermal conductivity of the prepreg mica tape of the invention tends to be further improved. When the content percentage of the boron nitride is 50% by volume or less, it is not likely that filling of the boron nitride into the resin is difficult.

—First Resin and Second Resin—

The first resin included in the boron nitride-containing layer according to the invention is not particularly limited. In order to form the mica tape into a prepreg state, a curable resin is desirably used as the first resin, and examples thereof include epoxy resins, phenolic resins, unsaturated polyester resins, and silicone resins. Epoxy resins are preferable in terms of adhesion and electrical insulation properties.

The second resin included in the mica-containing layer according to the invention is not particularly limited. In order to form the mica tape into a prepreg state, a curable resin is desirably used as the second resin, and examples thereof include epoxy resins, phenolic resins, unsaturated polyester resins, and silicone resins. Epoxy resins are preferable in terms of adhesion and electrical insulation properties.

In the invention, the first resin and the second resin may be of the same kind or of different kinds from each other. In terms of facilitating manufacturing of the prepreg mica tape of the invention, the first resin and the second resin are preferably of the same kind.

In a case of using an epoxy resin as the first resin or the second resin, examples of the epoxy resin include bisphenol A type epoxy resins, bisphenol F type epoxy resins, phenol novolak type epoxy resins, cresol novolak type epoxy resins, naphthalene type epoxy resins, biphenyl type epoxy resins, and cyclic aliphatic epoxy resins. Among the epoxy resins, it is preferable to use biphenyl type epoxy resins that contain a mesogen group having an easily self-aligned structure, such as a biphenyl group, in the molecule thereof, in terms of obtaining high thermal conductivity.

The mesogen group referred to in the invention means a group that, in a case in which an epoxy resin is cured to form a resin cured product, is capable of forming a high-order structure in the resin cured product.

The high-order structure referred to in the invention means a state in which molecules are oriented and aligned after curing of the epoxy resin, and for example, means that a crystal structure body is present in the resin cured product. The presence of such a crystal structure body may be confirmed by observation through a polarizing microscope under crossed nicols or by X-ray scattering spectra.

In a case of using an epoxy resin as the first resin or the second resin, the epoxy resins may be used singly or in combination of two or more kinds thereof.

—Mica—

Examples of mica included in the mica-containing layer according to the invention include uncalcined hard mica paper, calcined hard mica paper, uncalcined soft mica paper, calcined soft mica paper, synthetic mica, and flake mica. Among these, it is preferable to use uncalcined hard mica paper as the mica in terms of price and availability.

In terms of improving insulation properties, the percentage of mica pieces having a particle size of 2.8 mm or more, obtained by sieving the mica using a JIS standard sieve, is preferably 50% by mass or more, more preferably 55% by mass or more, and still more preferably 60% by mass or more. When the percentage of the mica pieces having a particle size of 2.8 mm or more is 50% by mass or more, mica paper is capable of supporting by itself even without any fibrit. No use of fibrit is more advantageous for thermal conductivity.

The particle size of mica pieces are measured according to the following method.

One percent by mass of a mica as a measurement object is added into 20 g of pure water and dispersed using an ultrasonic disperser to prepare a dispersion. The dispersion is applied onto a film, and then the film is placed on a hot plate to dry at 110° C. for 30 minutes. After drying, the sizes of mica pieces on the film are visually observed to measure the particle size of the mica.

Additionally, the percentage (by mass) of mica pieces having a particle size of 2.8 mm or more is measured by the following method.

Using a JIS standard sieve having a mesh opening size of 2.8 mm attached to a low tap type sieve shaker, 1.2 g of the mica is classified through the sieves while shaking the sieves (hammer strokes: 60 times/minute) for 15 minutes, and the percentage (by mass) of mica pieces having a particle size of 2.8 mm or more is obtained from the percentage of coarse particles remaining on the 2.8 mm sieves with respect to a sample mass before classification.

In the invention, the micas may be used singly or in combination of two or more kinds thereof. Examples of combination of two or more kinds of micas include use of two or more kinds of micas that are the same in component and different in average particle size, use of two or more kinds of micas that are the same in average particle size and different in component, and use of two or more kinds of micas that are different in average particle size and kind.

—Other Components—

Examples of other components that may be included in the boron nitride-containing layer and the mica-containing layer according to the invention include a curing agent, a curing catalyst, and various kinds of additives.

(Curing Agent)

In a case of using a curable resin as the first resin or the second resin, the boron nitride-containing layer and the mica-containing layer according to the invention preferably further include at least one curing agent as a curable component in addition to the curable resin. The curing agent is not particularly limited and may be selected, as appropriate, according to the kind of the curable resin.

Particularly, in a case in which the curable resin is an epoxy resin, the curing agent can be used by selecting, as appropriate, from curing agents commonly used as epoxy resin curing agents. Specific examples of the curing agent include amine curing agents such as dicyandiamide or an aromatic diamine, and phenolic resin curing agents such as phenol novolak or cresol novolak.

In a case in which the curable resin is an epoxy resin, the ratio of the curing agent to the epoxy resin is preferably set to an equivalent ratio (curing agent/epoxy resin) ranging from 0.8 to 1.2 in terms of curing property and electrical characteristics of a cured product.

(Curing Catalyst)

In the case in which a curable resin is used as the first resin or the second resin, a curing catalyst may be added to the boron nitride-containing layer and the mica-containing layer according to the invention in order to accelerate a curing reaction of the curable resin or a curing reaction between the curable resin and a curing agent. The curing catalyst is not particularly limited and may be used by selecting, as appropriate, according to the kinds of the curable resin and a curing agent used if necessary. Examples of the curing catalyst include triphenylphosphine, trimethylamine, 2-methyl-4-ethyl imidazole, and $BF_3$ monoethylamine.

The percentage of a curing catalyst to be added in the case in which the curable resin is an epoxy resin is typically from 0.01 to 5% by mass with respect to the total amount of the epoxy resin and a curing agent used if necessary.

(Additives)

The boron nitride-containing layer and the mica-containing layer according to the invention may further include various kinds of additives, if necessary. Examples of the other additives include various kinds of additives commonly used in resin compositions, such as coupling agents, elastomers, antioxidants, anti-aging agents, stabilizers, flame retardants, and thickeners. In a case in which the boron nitride-containing layer and the mica-containing layer according to the invention further include additives, the amounts of the additives contained are not particularly limited as long as the effects of the invention are not impaired.

<Method of Manufacturing Prepreg Mica Tape>

The prepreg mica tape of the invention may be manufactured through any steps, and a conventionally known manufacturing method may be applied.

One example of the method of manufacturing the prepreg mica tape of the invention is a method including: a boron nitride mixed solution preparation step of preparing a boron nitride mixed solution (BN-containing resin varnish) obtained by mixing a resin, boron nitride, and other materials to be used if necessary in a solvent; a coating step of coating one surface of the backing material with the boron nitride mixed solution; and a bonding step of bonding mica paper to the surface of the backing material coated with the boron nitride mixed solution.

In order to fill the boron nitride into the resin, the resin may be diluted with a solvent. The solvent to be used is selected, as appropriate, from commonly used organic solvents. Specific examples of the solvent include solvents such as methyl ethyl ketone, methanol, or cyclohexane.

In the coating step, the one surface of the backing material is coated with the boron nitride-containing solution and dried, whereby the boron nitride-containing layer according to the invention is formed. The mica paper bonded to the surface of the backing material coated with the boron nitride mixed solution is impregnated with the resin included in the boron nitride mixed solution and other materials to be used if necessary, whereby the region of the mica paper is formed as the mica-containing layer according to the invention.

The first resin and the second resin according to the prepreg mica tape of the invention manufactured through the above-described steps are both the same kind of resin originating from the resin included in the boron nitride mixed solution.

When the one surface of the backing material is coated with the boron nitride mixed solution in the coating step, use of a cloth such as glass cloth as the backing material may cause a part of the boron nitride mixed solution to leak out onto another surface of the backing material. By drying the leaked solution, a boron nitride-containing layer may also be formed on the other surface of the backing material. The prepreg mica tape of the invention encompasses a prepreg mica tape including the boron nitride-containing layer also formed on the other surface of the backing material.

The prepreg mica tape of the invention may be used to form an insulation layer of a coil. In addition, the prepreg mica tape of the invention can also be used as a heat-resistant electrically insulating heat-dissipating spacer, for example, as a material that exhibits improved heat dissipation performance in a power transistor heat dissipating insulation plate.

<<Coil>>

The coil of the invention includes an insulation layer that is a layered body formed by layering the prepreg mica tape of the invention.

An example of a method of forming an insulation layer using the prepreg mica tape of the invention is a method in which the prepreg mica tape of the invention is wound around a region of a coil on which an insulation layer is to be formed, and the first resin and the second resin included in the boron nitride-containing layer and the mica-containing layer are cured or fused by heating and pressurizing or by heating and pressurizing after a vacuum treatment to integrate the prepreg mica tape, thereby forming an insulation layer.

The prepreg mica tape of the invention exhibits favorable flexibility and thus is excellent in workability when winding the tape. In addition, since the prepreg mica tape of the invention exhibits high dielectric withstanding voltage, the coil of the invention is excellent in insulation reliability. Furthermore, the prepreg mica tape of the invention has a high thermal conductivity. Accordingly, in cooling the coil of the invention, a hydrogen cooling system or an air cooling system may be employed even for a coil having a size for which a water direct cooling system has conventionally been employed, allowing simplification of a coil structure.

EXAMPLES

Hereinafter, the invention will be more specifically described by way of Examples. However, the invention is not limited to the Examples.

Example 1

(1) Production of Mica Paper

A mica (the content percentage of mica pieces having a particle size of 2.8 mm or more was 63% by mass) was dispersed in water to prepare mica particles, and papermaking was performed using a papermaking machine to produce a sheet of mica paper having an average thickness of 0.13 mm. The average thickness of the mica paper was obtained as an arithmetic mean value resulting from measurement of thicknesses of 10 points using a micrometer (MDC-SB, available from Mitutoyo Corporation). Hereinafter, the average thickness of mica paper was measured by the same method.

(2) Preparation of BN-Containing Resin Varnish

First, 30.8 parts by mass of an epoxy resin (trade name "DEN 438" available from Dow Chemical Company), 1.0 part by mass of $BF_3$ monoethylamine (Wako Pure Chemical Industries, Ltd.) as a curing catalyst, and 37.2 parts by mass of methyl ethyl ketone (Wako Pure Chemical Industries, Ltd.) as a solvent were mixed together. Then, 31.0 parts by mass of a boron nitride (trade name "SP-3", average particle size 5 μm, available from Denka Company Ltd.) was added thereto, followed by further mixing, thereby obtaining a BN-containing resin varnish.

The content percentage of the boron nitride in the total solid content volume of the BN-containing resin varnish was 35% by volume.

(3) Production of Prepreg Mica Tape

The obtained BN-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm. The average thickness of the prepreg mica tape was obtained as an arithmetic mean value resulting from measurement of thicknesses of 10 points using a micrometer (MDC-SB, available from Mitutoyo Corporation). Hereinafter, the average thicknesses of prepreg mica tapes were measured by the same method.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The mica tape cured product had an average thickness of 180 μm. The average thickness of the mica tape cured product was obtained as an arithmetic mean value resulting from measurement of thicknesses of 10 points using a micrometer (MDC-SB, available from Mitutoyo Corporation). Hereinafter, the average thicknesses of mica tape cured products were measured by the same method.

<Evaluation>

The prepreg mica tape or the mica tape cured product obtained above was evaluated as follows. Table 1 shows the results.

(Flexibility)

Flexibility of the obtained prepreg mica tape was measured in accordance with JIS C2116: 2011. The temperature of the measurement was 23±2° C., and the speed of pressing in was 10 mm/min.

The flexibility of the prepreg mica tape obtained as above was 66 N/m. Handling thereof was favorable, and no problem occurred during taping work thereof.

(Thermal Conductivity)

The thermal resistance value of the obtained mica tape cured product was measured using a thermal resistance apparatus (YST-901S, available from Yamayo Tester Co., Ltd). The thermal conductivity (W/m·K) thereof was obtained by inverse calculation of the obtained thermal resistance value.

The mica tape cured product had a thermal conductivity of 0.75 W/m·K.

(Dielectric Breakdown Electric Field)

The dielectric breakdown electric field of the obtained mica tape cured product was measured using a dielectric breakdown tester (SOKEN insulating material test system, DAC-6032C). The measurement was performed by locating the product between cylindrical electrodes having a dimeter of 10 mm, at a voltage increase rate of 500 V/s, an AC frequency of 50 Hz, a cut-off current of 10 mA, and room temperature (25±1° C.) in oil.

The dielectric breakdown electric field of the mica tape cured product was 39 kV/mm.

Example 2

(1) Production of Mica Paper

Mica paper was produced in the same manner as in Example 1.

(2) Preparation of BN-Containing Resin Varnish

First, 41.5 parts by mass of an epoxy resin (trade name "DEN 438", available from Dow Chemical Company), 1.3 parts by mass of $BF_3$ monoethylamine (Wako Pure Chemical Industries, Ltd.) as a curing catalyst, and 31.2 parts by mass of methyl ethyl ketone (Wako Pure Chemical Industries, Ltd.) as a solvent were mixed together. Then, 26.0 parts by mass of a boron nitride (trade name "SP-3", average particle size 5 μm, available from Denka Company Ltd.) was added thereto, followed by further mixing, thereby obtaining a BN-containing resin varnish.

The content percentage of the boron nitride in the total solid content volume of the BN-containing resin varnish was 25% by volume.

(3) Production of of Prepreg Mica Tape

The obtained BN-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The mica tape cured product had an average thickness of 180 μm.

The obtained prepreg mica tape and mica tape cured product were evaluated in the same manner as in Example 1. The flexibility of the prepreg mica tape obtained as above was 76 N/m. Handling thereof was favorable, and no problem occurred during taping work thereof.

The obtained mica tape cured product had a thermal conductivity of 0.63 W/m·K.

In addition, the obtained mica tape cured product had a dielectric breakdown electric field of 38 kV/mm.

Example 3

(1) Production of Mica Paper

Mica paper was produced in the same manner as in Example 1.

(2) Preparation of BN-Containing Resin Varnish

First, 24.5 parts by mass of an epoxy resin (trade name "DEN 438", available from Dow Chemical Company), 0.8 parts by mass of $BF_3$ monoethylamine (Wako Pure Chemical Industries, Ltd.) as a curing catalyst, and 49.8 parts by mass of methyl ethyl ketone (Wako Pure Chemical Industries, Ltd.) as a solvent were mixed together. Then, 24.9 parts by mass of a boron nitride (trade name "SP 3-7", average particle size 2 μm, manufactured by Denka Company Ltd.) was added thereto, followed by further mixing, thereby obtaining a BN-containing resin varnish.

The content percentage of the boron nitride in the total solid content volume of the BN-containing resin varnish was 35% by volume.

(3) Production of Prepreg Mica Tape

The obtained BN-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The obtained mica tape cured product had an average thickness of 180 μm.

The obtained prepreg mica tape and mica tape cured product were evaluated in the same manner as in Example 1. The flexibility of the prepreg mica tape obtained as above was 59 N/m. Handling thereof was favorable, and no problem occurred during taping work thereof.

The obtained mica tape cured product had a thermal conductivity of 0.67 W/m·K.

In addition, the obtained mica tape cured product had a dielectric breakdown electric field of 37 kV/mm.

Example 4

(1) Production of Mica Paper

Mica paper was produced in the same manner as in Example 1.

(2) Preparation of BN-Containing Resin Varnish

First, 34.1 parts by mass of an epoxy resin (trade name "DEN 438", available from Dow Chemical Company), 1.1 parts by mass of $BF_3$ monoethylamine (Wako Pure Chemical Industries, Ltd.) as a curing catalyst, and 43.2 parts by mass of methyl ethyl ketone (Wako Pure Chemical Industries, Ltd.) as a solvent were mixed together. Then, 21.6 parts by mass of a boron nitride (trade name "SP 3-7", average particle size 2 μm, available from Denka Company Ltd.) was added thereto, followed by further mixing, thereby obtaining a BN-containing resin varnish.

The content percentage of the boron nitride in the total solid content volume of the BN-containing resin varnish was 25% by volume.

(3) Production of Prepreg Mica Tape

The obtained BN-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The mica tape cured product had an average thickness of 180 μm.

The obtained prepreg mica tape and mica tape cured product were evaluated in the same manner as in Example 1. The flexibility of the prepreg mica tape obtained as above was 62 N/m. Handling thereof was favorable, and no problem occurred during taping work thereof.

The obtained mica tape cured product had a thermal conductivity of 0.61 W/m·K.

In addition, the obtained mica tape cured product had a dielectric breakdown electric field of 36 kV/mm.

Comparative Example 1

(1) Production of Mica Paper

Mica paper was produced in the same manner as in Example 1.

(2) Preparation of Filler-Non-Containing Resin Varnish

First, 100 parts by mass of an epoxy resin (trade name "DEN 438", available from Dow Chemical Company) and 3 parts by mass of $BF_3$ monoethylamine (Wako Pure Chemical Industries, Ltd.) as a curing catalyst were mixed together to obtain a filler-non-containing resin varnish.

(3) Production of Prepreg Mica Tape

The obtained filler-non-containing resin varnish was applied onto a glass cloth (WEA 03G 103, available from SOYO Co., Ltd.) using a roll coater and then bonded with the mica paper. After that, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The mica tape cured product had an average thickness of 180 μm.

The obtained prepreg mica tape and mica tape cured product were evaluated in the same manner as in Example 1. The flexibility of the prepreg mica tape obtained as above was 95 N/m. Handling thereof was favorable, and no problem occurred during taping work thereof.

The obtained mica tape cured product had a thermal conductivity of 0.30 W/m·K.

In addition, the obtained mica tape cured product had a dielectric breakdown electric field of 35 kV/mm.

Comparative Example 2

(1) Production of Mica Paper

Mica paper was produced in the same manner as in Example 1.

(2) Preparation of Alumina-Containing Resin Varnish

First, 25.2 parts by mass of an epoxy resin (trade name "DEN 438", available from Dow Chemical Company), 0.8 parts by mass of $BF_3$ monoethylamine (Wako Pure Chemical Industries, Ltd.) as a curing catalyst, and 27.8 parts by mass of methyl ethyl ketone (Wako Pure Chemical Industries, Ltd.) as a solvent were mixed together. Then, 46.2 parts by mass of alumina (trade name "AA3", average particle size 3 μm, available from Denka Company Ltd.) was added thereto, followed by further mixing, thereby obtaining an alumina-containing resin varnish.

The content percentage of the alumina in the total solid content volume of the alumina-containing resin varnish was 35% by volume.

(3) Production of Prepreg Mica Tape

The obtained alumina-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The obtained mica tape cured product had an average thickness of 180 μm.

The obtained prepreg mica tape and mica tape cured product were evaluated in the same manner as in Example 1. The flexibility of the prepreg mica tape obtained as above was 300 N/m. Since the tape was hard, it was impossible to perform coil taping.

The obtained mica tape cured product had a thermal conductivity of 0.41 W/m·K.

In addition, the obtained mica tape cured product had a dielectric breakdown electric field of 30 kV/mm.

Comparative Example 3

(1) Production of Mica Paper

Mica paper was produced in the same manner as in Example 1.

(2) Preparation of Alumina-Containing Resin Varnish

First, 35.1 parts by mass of an epoxy resin (trade name "DEN 438", available from Dow Chemical Company), 1.1 parts by mass of $BF_3$ monoethylamine (Wako Pure Chemical Industries, Ltd.) as a curing catalyst, and 24.0 parts by mass of methyl ethyl ketone (Wako Pure Chemical Industries, Ltd.) as a solvent were mixed together. Then, 39.8 parts by mass of alumina (trade name "AA3", average particle size 3 μm, available from Denka Company Ltd.) was added thereto, followed by further mixing, thereby obtaining an alumina-containing resin varnish.

The content percentage of the alumina in the total solid content volume of the alumina-containing resin varnish was 25% by volume.

(3) Production of Prepreg Mica Tape

The obtained alumina-containing resin varnish was applied onto a glass cloth (WEA 03G 103, available from SOYO Co., Ltd.) using a roll coater and then bonded with the mica paper. After drying, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The obtained mica tape cured product had an average thickness of 180 μm.

The obtained prepreg mica tape and mica tape cured product were evaluated in the same manner as in Example 1. The flexibility of the prepreg mica tape obtained as above was 250 N/m. Since the tape was hard, it was impossible to perform coil taping.

The obtained mica tape cured product had a thermal conductivity of 0.35 W/m·K.

In addition, the obtained mica tape cured product had a dielectric breakdown electric field of 31 kV/mm.

Comparative Example 4

(1) Production of BN-containing Mica Paper

A mica (the content percentage of mica pieces having a particle size of 2.8 mm or more was 63% by mass) and a boron nitride (trade name "SP-3", average particle size 5 μm, available from Denka Company Ltd.) were dispersed in water, and papermaking was performed using a papermaking machine to produce BN-containing mica paper having a thickness of 0.13 mm. In this case, the filling percentage of the boron nitride was 35% by volume with respect to the volume sum of the boron nitride and the mica.

(2) Preparation of Filler-Non-containing Resin Varnish

First, 100 parts by mass of an epoxy resin (trade name "DEN 438", available from Dow Chemical Company) and 3 parts by mass of $BF_3$ monoethylamine (Wako Pure Chemical Industries, Ltd.) as a curing catalyst were mixed together to obtain a filler-non-containing resin varnish.

(3) Production of Prepreg Mica Tape

The obtained filler-noncontaining resin varnish was applied onto a glass cloth (WEA 03G 103, available from SOYO Co., Ltd.) using a roll coater and then bonded with the BN-containing mica paper. In this case, the content percentage of the boron nitride with respect to the sum of the total solid content except for the backing material and the mica included in the prepreg mica tape was 35% by volume. After that, the resulting product was cut to a width of 30 mm to form a prepreg mica tape. The obtained prepreg mica tape had an average thickness of 280 μm.

(4) Production of Cured Product of Prepreg Mica Tape

The prepreg mica tape obtained by the above-described method was heated under a pressure of 10 MPa at 110° C. for 10 minutes. After that, the prepreg mica tape was heated under a pressure of 10 MPa at 170° C. for 60 minutes to obtain a cured product of the mica tape. The mica tape cured product had an average thickness of 180 μm.

The obtained prepreg mica tape and mica tape cured product were evaluated in the same manner as in Example 1. The flexibility of the prepreg mica tape obtained as above was 80 N/m. Handling thereof was favorable, and no problem occurred during taping work thereof.

The obtained mica tape cured product had a thermal conductivity of 0.40 W/m·K.

In addition, the obtained mica tape cured product had a dielectric breakdown electric field of 34 kV/mm.

Figure 2:
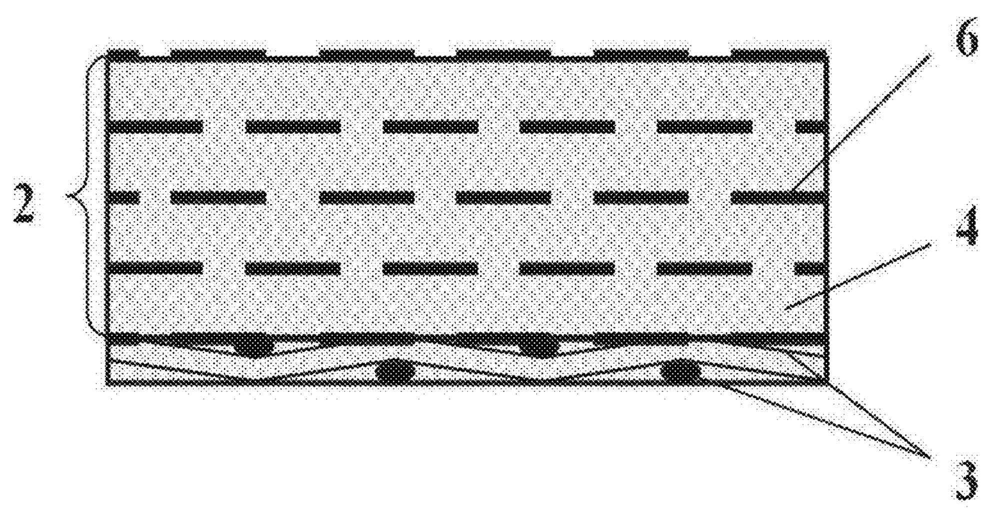
FIG. 2 is a schematic sectional view showing a prepreg mica tape of Comparative Example 1.
Figure 3:
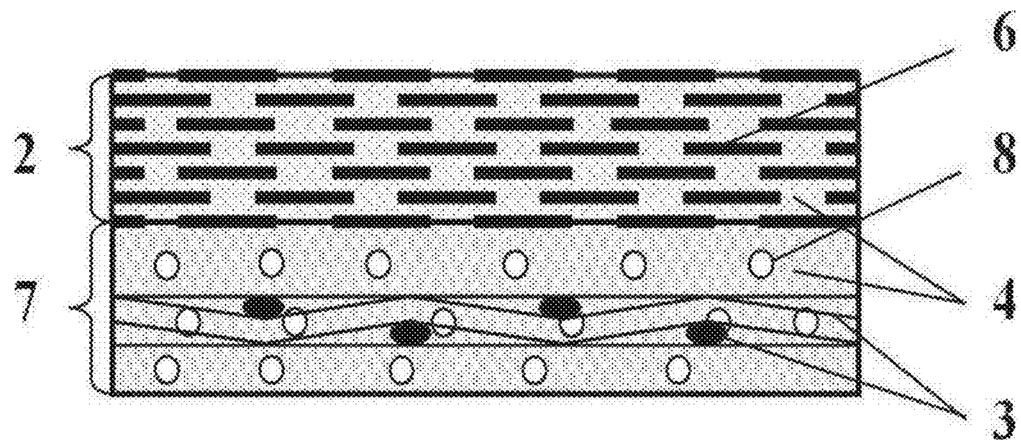
FIG. 3 is a schematic sectional view showing prepreg mica tapes of Comparative Examples 2 to 3.
Figure 4:
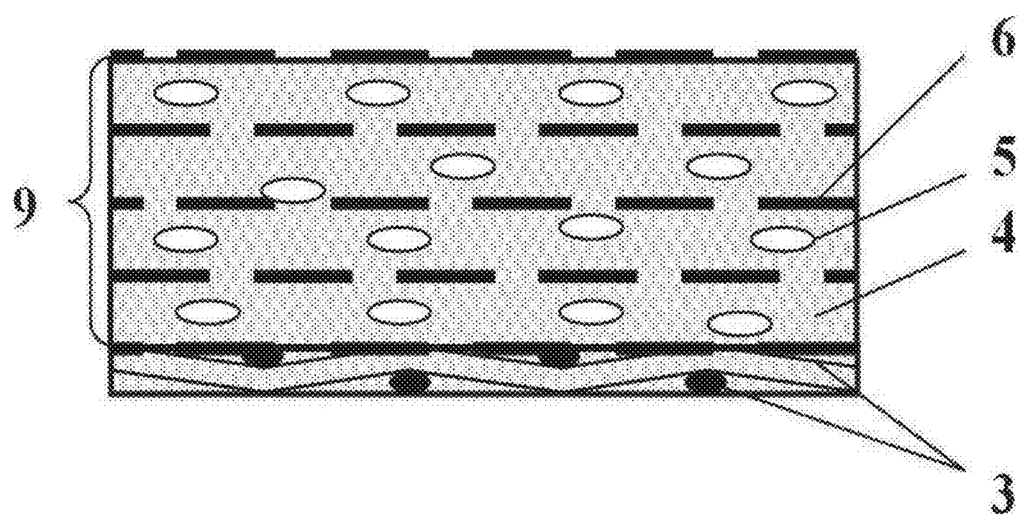
FIG. 4 is a schematic sectional view showing a prepreg mica tape of Comparative Example 4.

FIG. 1 is a schematic sectional view showing the prepreg mica tapes of Examples 1 to 4. FIG. 2 is a schematic sectional view showing the prepreg mica tape of Comparative Example 1. FIG. 3 is a schematic sectional view showing the prepreg mica tapes of Comparative Examples 2 to 3. FIG. 4 is a schematic sectional view showing the prepreg mica tape of Comparative Example 4.

In FIGS. 1 to 4, reference sign 1 denotes a boron nitride-containing layer, reference sign 2 denotes a mica-containing layer, reference sign 3 denotes a backing material, reference sign 4 denotes a resin (first resin and second resin), reference sign 5 denotes a boron nitride particle, reference sign 6 denotes mica, reference sign 7 denotes an alumina-containing layer, reference sign 8 denotes an alumina particle, and reference sign 9 denotes a boron nitride-containing mica-containing layer, respectively.

In Table 1, the inorganic filler refers to BN or alumina, and not mica.

TABLE 1

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Kind of inorganic filler | BN | | | | None | Alumina | | BN |
| Mica-containing layer/ inorganic filler-containing layer | Independent | | | | — | Independent | | Integrated |
| Average particle size of inorganic filler (μm) | 5 | 5 | 2 | 2 | — | 3 | 3 | 5 |
| Amount of inorganic filler added (% by volume) | 35 | 25 | 35 | 25 | 0 | 35 | 25 | 35 |
| Flexibility (N/m) | 66 | 76 | 59 | 62 | 95 | 300 | 250 | 80 |
| Thermal conductivity (W/m · .K) | 0.75 | 0.63 | 0.67 | 0.61 | 0.30 | 0.41 | 0.35 | 0.40 |
| Dielectric breakdown electric field (kV/mm) | 39 | 38 | 37 | 36 | 35 | 30 | 31 | 34 |

As is clear from Table 1, according to the invention, a highly-thermal conductive prepreg mica tape can be obtained which, while having a high thermal conductivity of 0.6 W/m·K or more, is also capable of achieving favorable coil taping work and high dielectric breakdown voltage, by filling boron nitride as the inorganic filler into the inorganic filler-containing layer of the prepreg mica tape and independently providing the inorganic filler-containing layer and the mica-containing layer.

The disclosure of Japanese Patent Application No. 2013-212223 is incorporated herein by reference in its entirety. In addition, all publications, patent applications, and technical specifications cited herein are incorporated by reference herein to the same extent as if the individual publications, patent applications, and technical specifications were specifically and individually recited as being incorporated by reference.

REFERENCE SIGNS LIST

1: Boron nitride-containing layer
2: Mica-containing layer
3: Backing material
4: Resin (first resin and second resin)
5: Boron nitride particle
6: Mica
7: Alumina-containing layer
8: Alumina particle
9: Boron nitride-containing mica-containing layer

The invention claimed is:

1. A prepreg mica tape, comprising:
a backing material;
a boron nitride-containing layer that is provided on or above one surface of the backing material, and that comprises boron nitride and a first resin; and
a mica-containing layer that is provided on or above the one surface of the backing material on which the boron nitride-containing layer is provided, and that comprises mica and a second resin,
wherein a content of the boron nitride is from 10 to 50% by volume, with respect to a total amount of all solid contents except the backing material and the mica included in the prepreg mica tape,
wherein the boron nitride-containing layer and the mica-containing layer are provided in this order on or above the one surface of the backing material, and
wherein the backing material comprises a glass cloth, the first resin comprises an epoxy resin, the second resin is the first resin, and the first resin extends into the mica-containing layer, through the boron nitride-containing layer, and into the backing material.

2. The prepreg mica tape according to claim 1, wherein a percentage of mica pieces having a particle size of 2.8 mm or more, obtained by sieving the mica using a JIS standard sieve, is 50% by mass or more.

3. The prepreg mica tape according to claim 1, wherein the boron nitride has an average particle size of from 1 μm to 40 μm.

4. A coil, comprising an insulation layer that is a layered body of the prepreg mica tape according to claim 1.

5. The prepreg mica tape according to claim 1, formed by a process comprising:
applying a boron nitride-containing resin varnish comprising the boron nitride and the first resin to the backing material, and
bonding a mica paper to a surface of the backing material coated with the boron nitride-containing resin varnish so as to allow the mica paper to be impregnated with the first resin, the mica-containing layer comprising the mica paper and the first resin.

6. The prepreg mica tape according to claim 1, wherein the first resin extends through the backing material so as to cover opposite surfaces of the backing material, and the boron nitride is within portions of the first resin covering the opposite surfaces of the backing material.

7. The prepreg mica tape according to claim 1 having a thickness ranging from 200 to 400 μm.

8. A prepreg mica tape, comprising:
a backing material;
a boron nitride-containing layer that is provided on or above one surface of the backing material, and that comprises boron nitride and a first resin; and
a mica-containing layer that is provided on or above the one surface of the backing material on which the boron nitride-containing layer is provided, and that comprises mica and a second resin,
wherein a content of the boron nitride is from 10 to 50% by volume, with respect to a total amount of all solid contents except the backing material and the mica included in the prepreg mica tape, and
wherein at least a portion of the boron nitride-containing layer is disposed between the mica-containing layer and the backing material, the backing material comprises a glass cloth, the first resin and the second resin comprise an epoxy resin, and the epoxy resin extends into the mica-containing layer, through the boron nitride-containing layer, and into the backing material.

9. The prepreg mica tape according to claim 8, wherein the boron nitride-containing layer and the mica-containing layer are provided in this order on or above the one surface of the backing material.

10. The prepreg mica tape according to claim 8, wherein a percentage of mica pieces having a particle size of 2.8 mm or more, obtained by sieving the mica using a JIS standard sieve, is 50% by mass or more.

11. The prepreg mica tape according to claim 8, wherein the boron nitride has an average particle size of from 1 μm to 40 μm.

12. A coil, comprising an insulation layer that is a layered body of the prepreg mica tape according to claim 8.

13. The prepreg mica tape according to claim 8, formed by a process comprising:
applying a boron nitride-containing resin varnish comprising the boron nitride and the first resin to the backing material, and
bonding a mica paper to a surface of the backing material coated with the boron nitride-containing resin varnish so as to allow the mica paper to be impregnated with the first resin, the mica-containing layer comprising the mica paper and the first resin.

14. The prepreg mica tape according to claim 8, wherein the first resin extends through the backing material so as to cover opposite surfaces of the backing material, and the boron nitride is within portions of the first resin covering the opposite surfaces of the backing material.

15. The prepreg mica tape according to claim 8 having a thickness ranging from 200 to 400 μm.

* * * * *